(12) United States Patent
Lister

(10) Patent No.: US 12,060,036 B1
(45) Date of Patent: Aug. 13, 2024

(54) THEFT PREVENTION SYSTEM AND METHOD OF USE

(71) Applicant: Richard Lister, Arlington, TX (US)

(72) Inventor: Richard Lister, Arlington, TX (US)

( * ) Notice: Subject to any disclaimer, the term of this patent is extended or adjusted under 35 U.S.C. 154(b) by 0 days.

(21) Appl. No.: 18/136,646

(22) Filed: Apr. 19, 2023

Related U.S. Application Data

(60) Provisional application No. 63/406,155, filed on Sep. 13, 2022.

(51) Int. Cl.
*B60R 25/10* (2013.01)

(52) U.S. Cl.
CPC ...... *B60R 25/1003* (2013.01); *B60R 25/1009* (2013.01)

(58) Field of Classification Search
CPC ............... B60R 25/1003; B60R 25/1009
See application file for complete search history.

(56) References Cited

U.S. PATENT DOCUMENTS

| | | | | |
|---|---|---|---|---|
| 4,107,543 A * | 8/1978 | Kaplan | ............... | B60R 25/1003 340/428 |
| 2013/0091770 A1 * | 4/2013 | Chen | ...................... | E05F 15/43 49/28 |

* cited by examiner

*Primary Examiner* — Daryl C Pope
(74) *Attorney, Agent, or Firm* — Richard Eldredge; Leavitt Eldredge Law Firm

(57) ABSTRACT

A theft prevention system includes a vehicle having an ignition switch; a sensor mounted to an undercarriage of the vehicle and having a shutter; an alarm; a series of relays including a first relay to open normally closed contacts when the ignition switch is on, thereby disconnecting constant voltage supply to the sensor, making the sensor inactive; a second relay to close normally open contacts when the sensor is activated; and a third relay to open and close the shutter to reveal the sensor based on whether the ignition switch is activated or deactivated, activation of the ignition switch closes normally open contacts to cause the shutter to close and conceal the sensor; the series of relays control when the sensor monitors and activation of the alarm upon detection by the sensor of movement.

2 Claims, 4 Drawing Sheets

THEFT PREVENTION SYSTEM AND METHOD OF USE

BACKGROUND

1. Field of the Invention

The present invention relates generally to theft prevention systems, and more specifically, to a theft prevention system for use with a vehicle, wherein the system aids in preventing theft of vehicle parts, specifically catalytic converters.

2. Description of Related Art

Theft prevention systems are well known in the art and are effective means to deter thefts, such as from a vehicle. For example, some conventional systems use sensors to detect when a vehicle is being broken into, however, these are not always effective when an exterior component of the vehicle is the target. There is a rise in thefts associated with catalytic converters and there is currently no effective solution to prevention and deterring of these thefts. Accordingly, although great strides have been made in the area of theft prevention systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
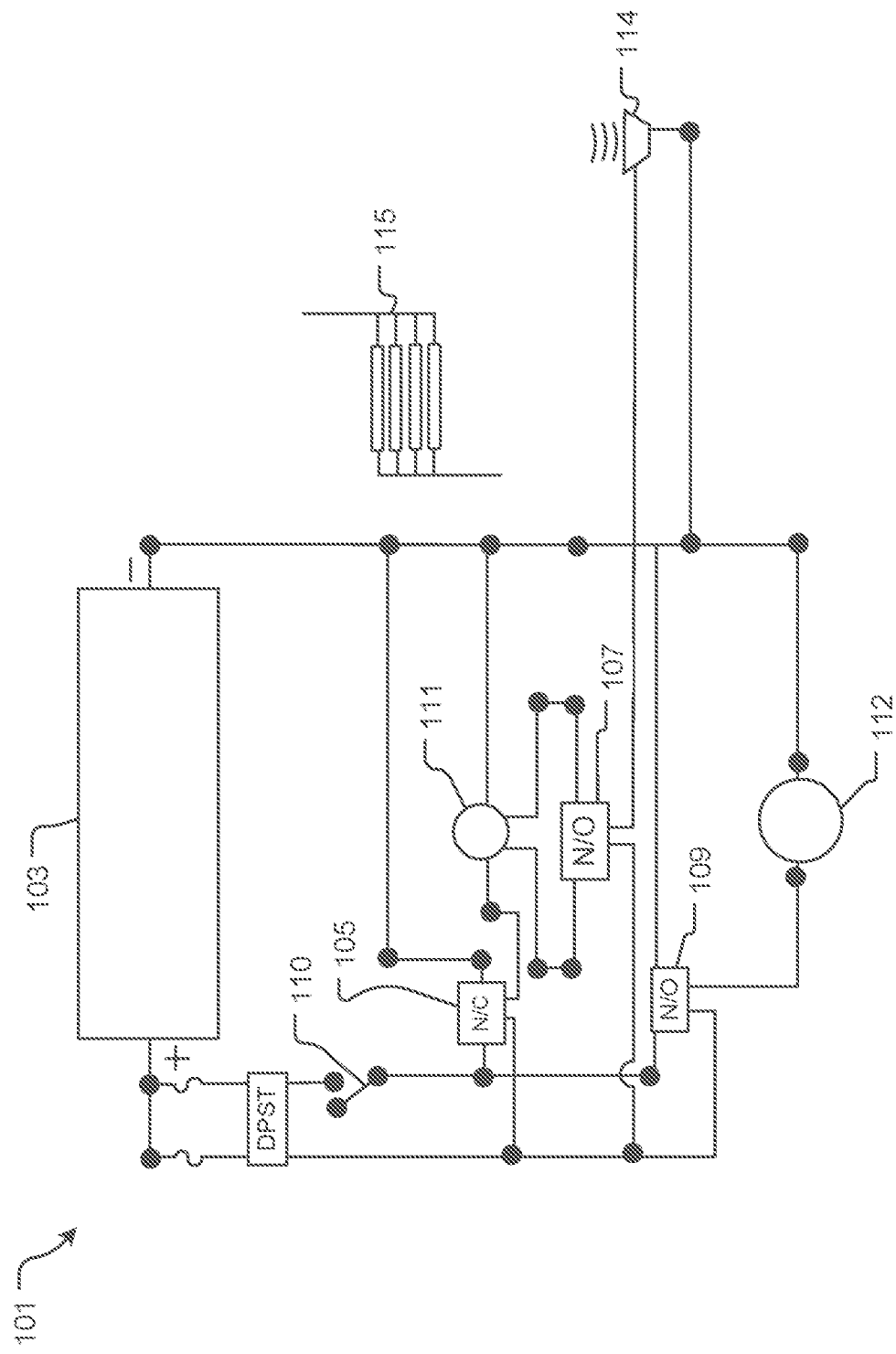
FIG. 1 is a schematic of the electrical connections of the theft prevention system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional theft prevention systems. Specifically, the present invention is specifically adapted to prevent theft from an exterior of the vehicle, such as a theft of the catalytic converter and functions automatically through a series of relays which provide for activation of an alarm 114 when two conditions are met, namely a first condition of the activation switch of the vehicle being deactivated and a second condition of a sensor being activated. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a schematic of the system 101 of the present invention in accordance with a preferred embodiment of the present application. It will be appreciated that system 101 overcomes one or more of the above-listed problems commonly associated with conventional theft prevention systems.

In the contemplated embodiment, system 101 includes a power supply 103, which may vary as would be known by those skilled in the art. The system 101 further includes three relays 105, 107, 109 in electrical communication with associated coils. A first relay 105 being an ultrasonic sensor relay with normally closed (N/C) contacts along the associated coil that are configured to open upon activation of a vehicle ignition switch 110.

A second relay 107 being an audible alert relay with normally open (N/O) contacts along the associated coil configured to close when an ultrasonic sensor 111 input voltage is actuated through sensing, such as sensing motion.

A third relay 109 being a rotary solenoid actuator relay with normally open (N/O) contacts along the associated coil configured to close upon activation of the ignition switch 110.

During operation, as 12 VDC is applied to the coil of relay #3 109 via the ignition/on-off switch 110, the coil is energized, closing the N/O contacts and sending 12 VDC from the constant voltage supply (power supply 103) to a rotary solenoid 112 associated with the sensor 111 causing it to actuate. This functions to rotate a shutter 212 to conceal the ultrasonic sensor sensing head and prevent road debris damage to sensor head while vehicle is in motion.

Simultaneously, 12 VDC is applied to the coil of relay #1 105 via the ignition/on-off switch 110, wherein ignition opens the N/C contacts of the associated coil of relay #1, thereby creating a disconnection of constant voltage supply to the ultrasonic sensor 111 input voltage supply. When the ultrasonic sensor's input voltage is actuated, it is then sent to relay #2 107 coil closing N/O contacts to operate alarm.

When the ignition switch 110 is turned off, relay #3 coil is deenergized; returning to its N/O position and disconnecting the voltage to the rotary solenoid, returning it to its original spring return position which exposes the ultrasonic sensor 111 sensing head, thereby allowing for the sensor to monitor and sense for movement at its location.

Simultaneously voltage is disconnected from the relay #1 105 coil returning it to its original N/C state which activates and arms the ultrasonic sensor for stationary undercarriage protection.

If and when ultrasonic sensor senses a movement while ignition is off and vehicle is stationary, and if someone or something gets under the vehicle from either side or front or rear and gets within the vicinity of the catalytic converter, the ultrasonic sensor will detect their presence and set off specified alarm, customized alarm or basic alarm. The alarm will cease when undercarriage intruder has cleared the beam protection area.

System 101 can further include four paralleled tilt switches 115, which can provide for determination of when the vehicle is unlevel, such as during hacking, lifting, or towing. This further helps in the prevention of theft.

Figure 2:
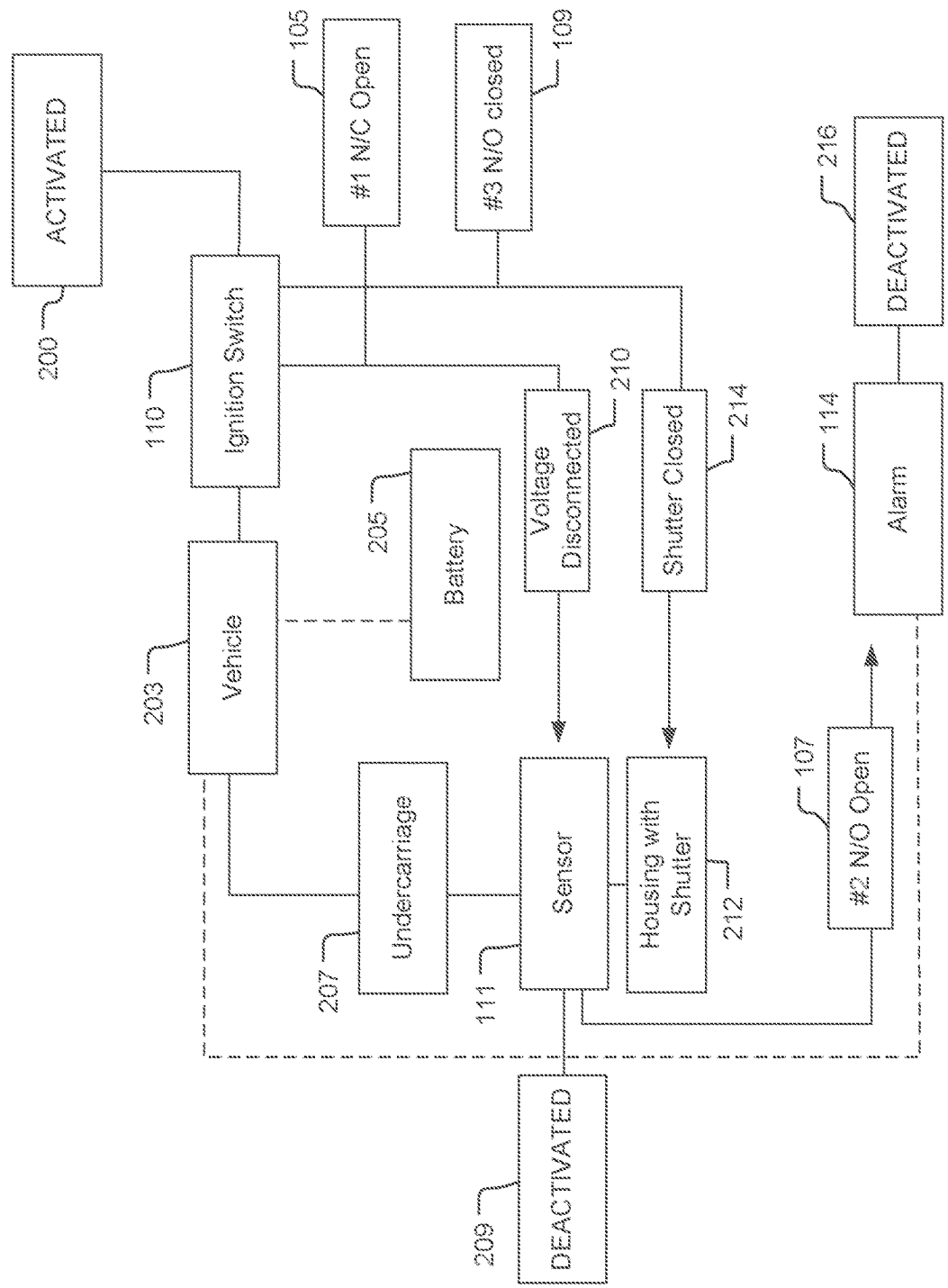
FIG. 2 is a schematic depicting the function of the theft prevention system when an ignition switch of a vehicle is in an active state.

In FIG. 2, a schematic depicts the function of the theft prevention system when the ignition switch 110 is in an activated 200 state. As shown, the ignition switch 110 is part of a vehicle 203 with a battery 205 and an undercarriage 207 as would be understood by those skilled in the art. When the ignition switch is in the activated state as shown, relay #1 105 is open, relay #2 107 is open, and relay #3 109 is closed. In return, the voltage 210 to the sensor 111 is disconnected so that the sensor is in a deactivated state 209. The shutter on a housing 212 is closed 214 to prevent damage to the sensor. And the alarm 114 is in a deactivated state 216. This figure demonstrates when the vehicle is on, such as being driven, when theft is not occurring.

Figure 3:
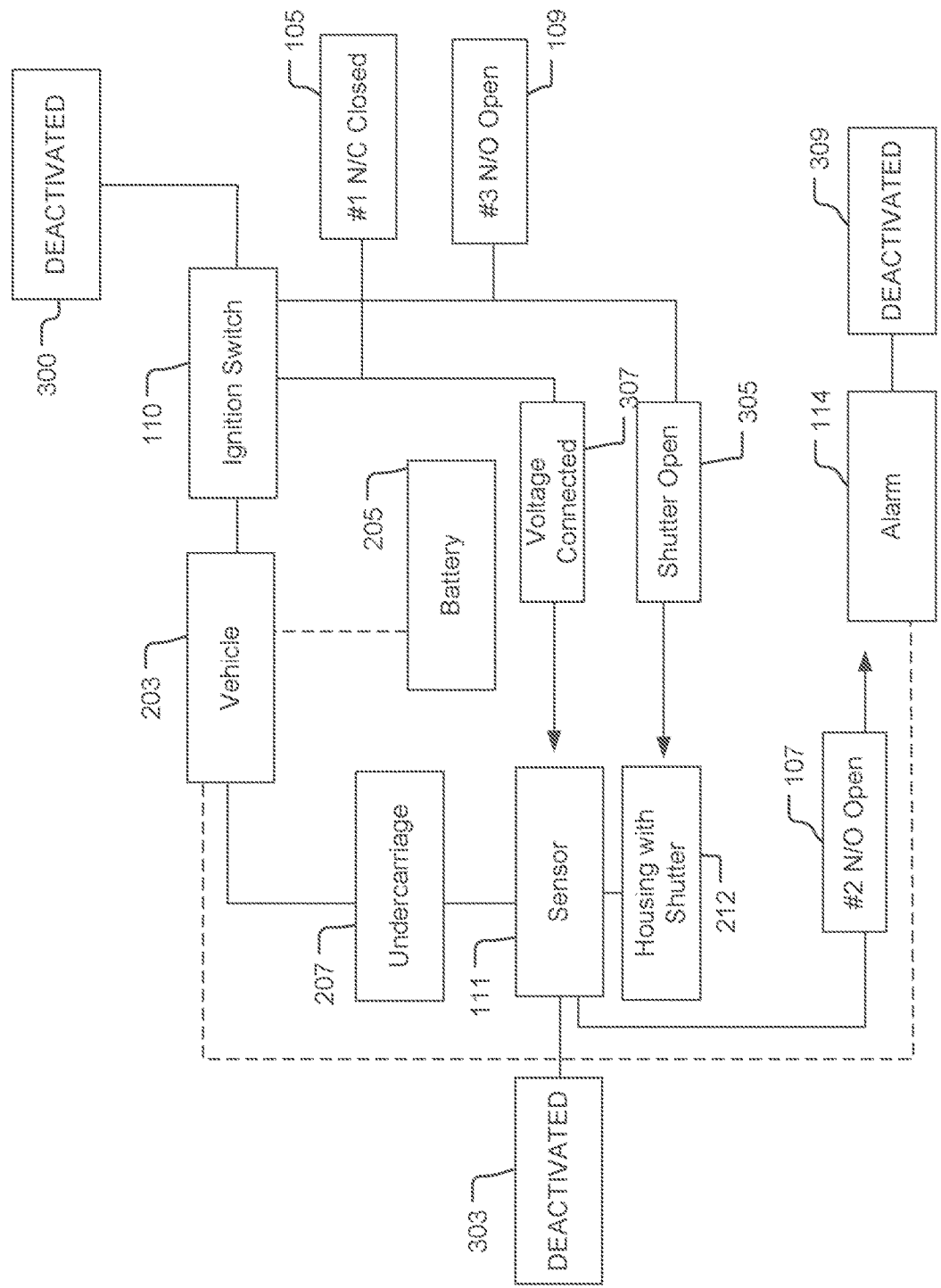
FIG. 3 is a schematic depicting the function of the theft prevention system when the ignition switch of the vehicle is in an inactive state and a sensor is in an inactive state.

In FIG. 3, a schematic depicts the function of the theft prevention system when the ignition switch 110 is in a deactivated 300 and when theft is not occurring, or in other words, when the sensor 111 is in a deactivated state 303. Here, the vehicle is not active, therefore the ignition switch is off. This results in relay #1 105 being closed and relay #3 109 being open, such that the shutter 212 will be open 305 to allow for the sensor head to monitor the surroundings. In addition, the voltage 307 to the sensor will be connected. Here, there is no movement to trigger the sensor 111 and accordingly, relay #2 107 is open and the alarm 114 remains untriggered and in a deactivated state 309.

Figure 4:
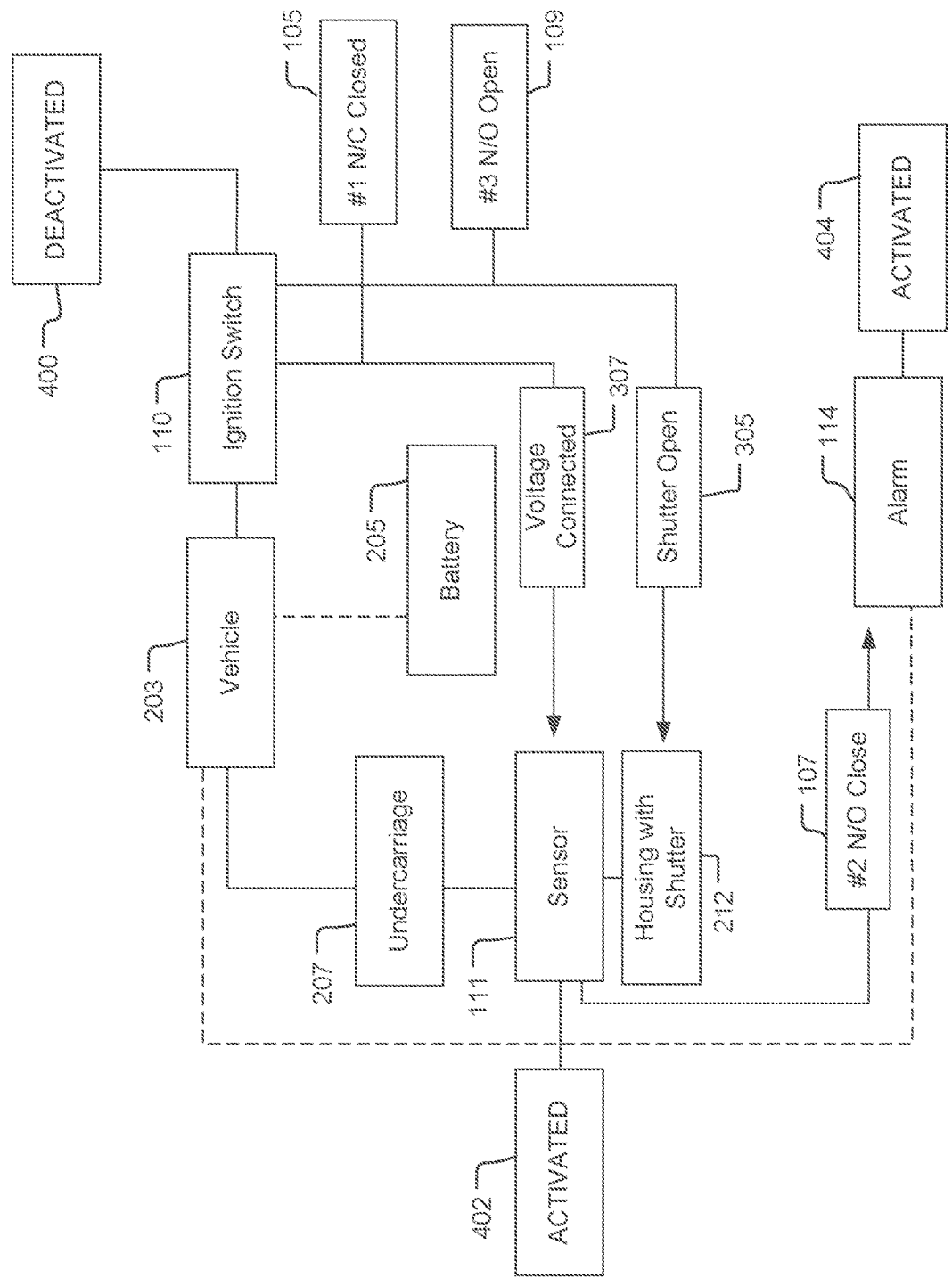
FIG. 4 is a schematic depicting the function of the theft prevention system when the ignition switch of the vehicle is in an inactive state and the sensor is in an active state.

Lastly, as shown in FIG. 4, a schematic depicts the function of the theft prevention system when the ignition switch 110 is in a deactivated state 400 and the sensor 111 is in an activated state 402, such as sensing the presence and movement of a person. Here, all of the functions are the same as discussed with FIG. 3, except that the sensor 111 is now activated such that relay #2 107 now closes, thereby completing the circuit to the alarm 114 and causing it to go into an activated state 404, thereby providing an audio alert.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A theft prevention system, comprising:
   a vehicle having an ignition switch configured to activate and deactivate the vehicle and a battery;
   a sensor mounted to an undercarriage of the vehicle and having a shutter;
   an alarm;
   a series of relays electrically connected between the sensor, the ignition switch, and the alarm, the series of relays including:
      a first relay configured to open normally closed contacts when the ignition switch is on, thereby disconnecting constant voltage supply to the sensor, making the sensor inactive when the ignition switch is on;
      a second relay configured to close normally open contacts when the sensor is activated; and
      a third relay configured to open and close the shutter to reveal the sensor based on whether the ignition switch is activated or deactivated, wherein activation of the ignition switch closes normally open contacts to cause the shutter to close and conceal the sensor;
   wherein the series of relays allow for the sensor to be active when the ignition switch is deactivated and for the sensor to be inactive when the ignition switch is activated; and
   wherein the series of relays allow for the alarm to be activated when the ignition switch is deactivated and when the sensor is activated by motion, thereby preventing theft from the undercarriage of the vehicle.

2. The system of claim 1, wherein the sensor is an ultrasonic sensor configured to detect movement.

* * * * *